Figure 1:
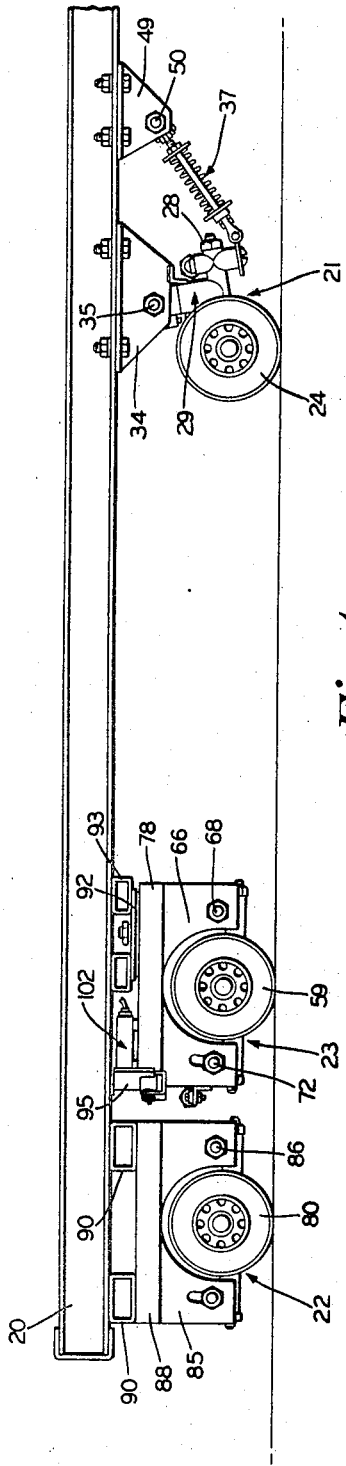

Aug. 8, 1967    R. J. MAUCK    3,334,912
VEHICLE WHEEL SUPPORT FOR TRAILERS AND THE LIKE
Filed April 1, 1965    4 Sheets-Sheet 1

INVENTOR.
Robert J. Mauck
BY
Frease, Bishop, Johns & Schick
ATTORNEYS

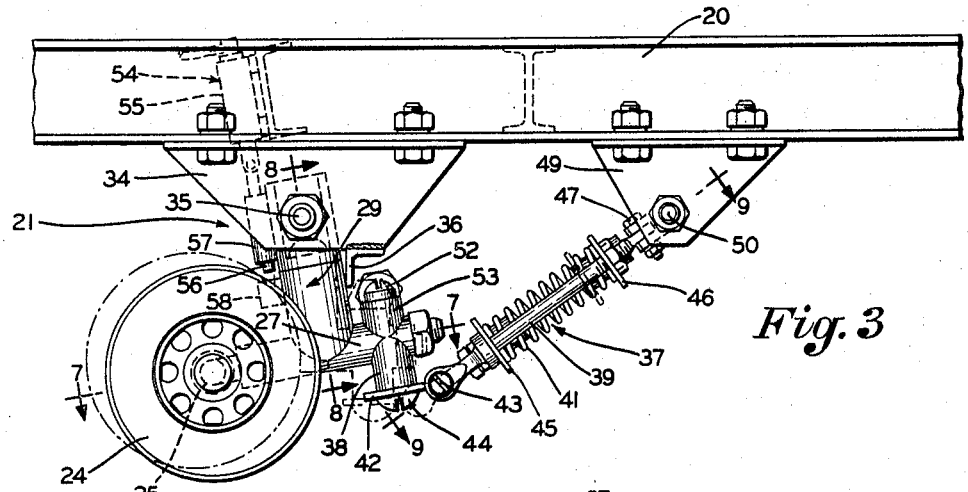
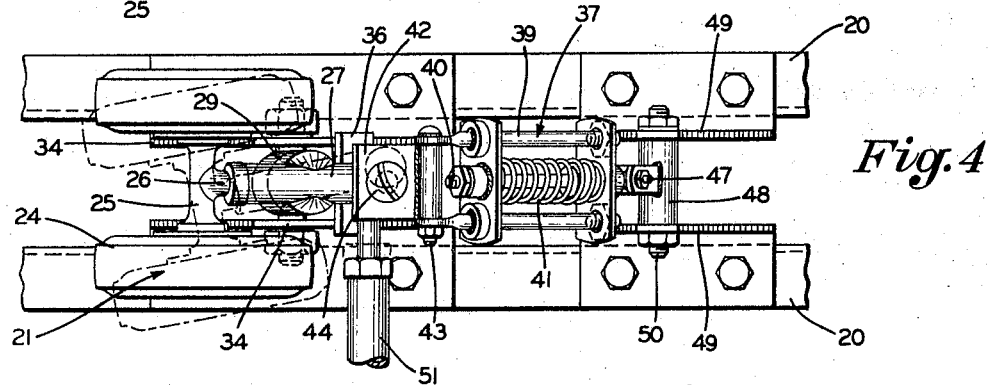
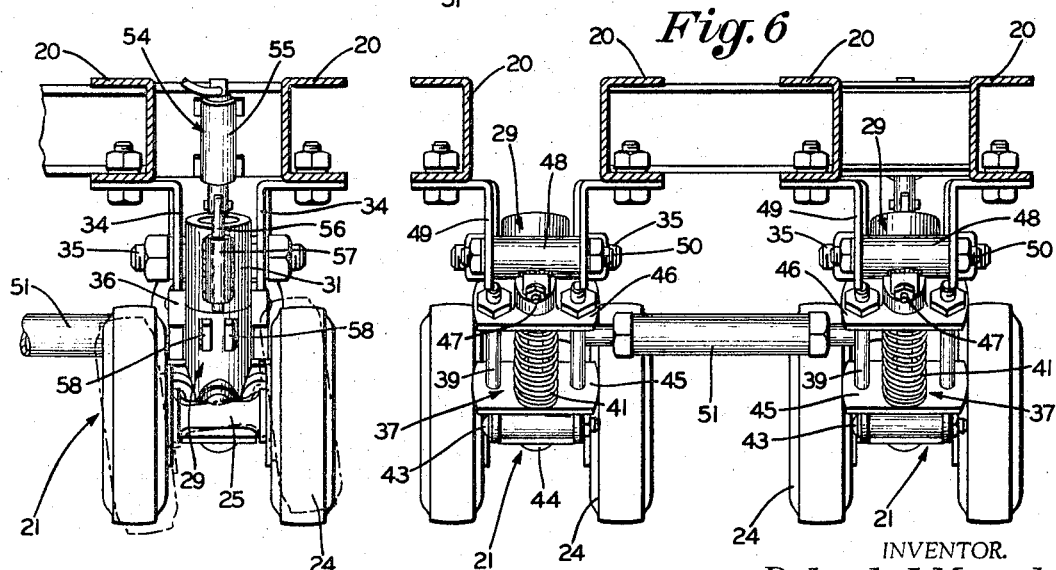

Aug. 8, 1967　　　　　R. J. MAUCK　　　　　3,334,912
VEHICLE WHEEL SUPPORT FOR TRAILERS AND THE LIKE
Filed April 1, 1965　　　　　　　　　　　　　　4 Sheets-Sheet 3

INVENTOR.
Robert J. Mauck
BY
Frease, Bishop, Johns & Schick
ATTORNEYS

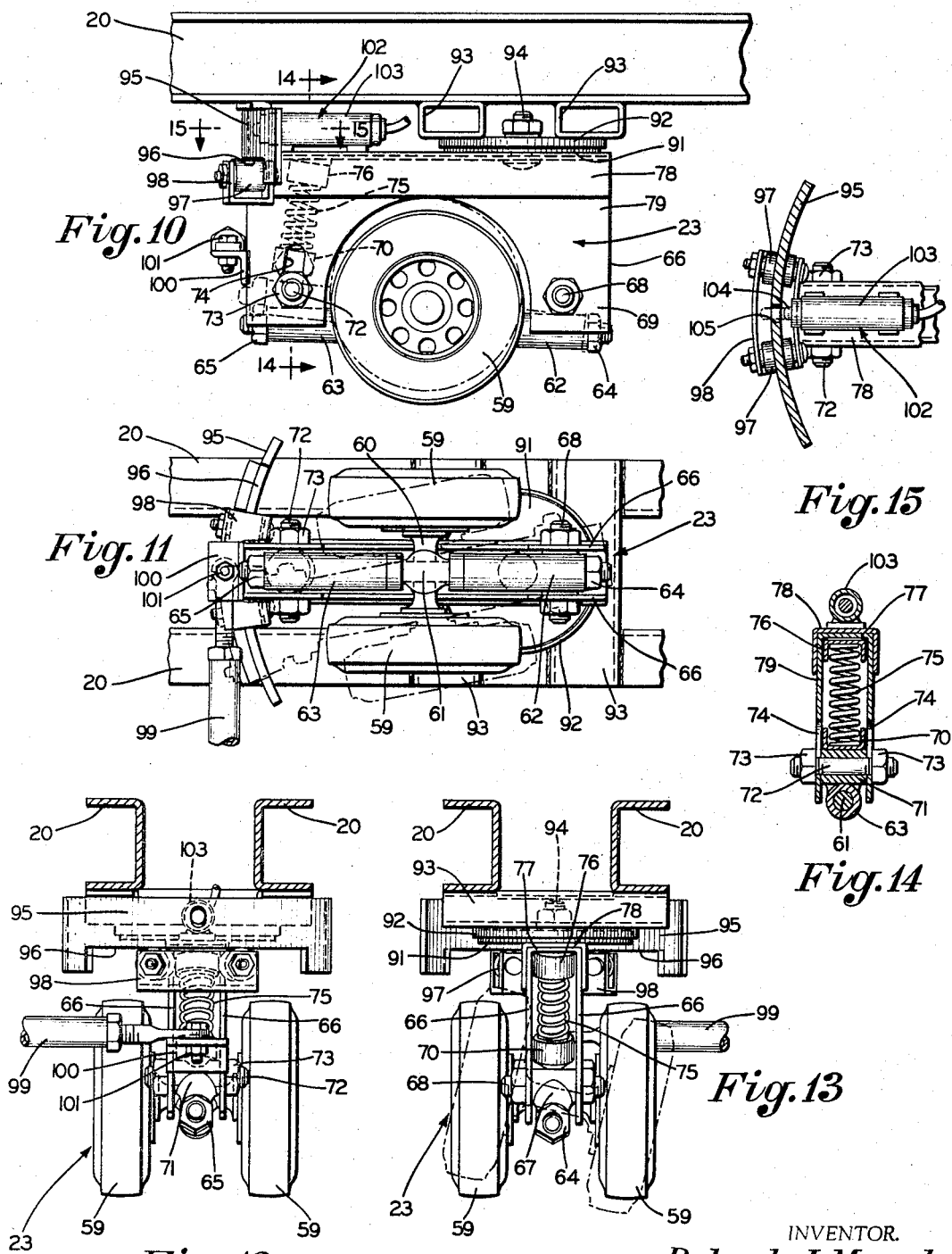

United States Patent Office 3,334,912
Patented Aug. 8, 1967

3,334,912
VEHICLE WHEEL SUPPORT FOR TRAILERS AND THE LIKE
Robert J. Mauck, 36½ N. Union Ave., Alliance, Ohio 44601
Filed Apr. 1, 1965, Ser. No. 444,579
8 Claims. (Cl. 280—81)

My invention relates to improvements in vehicle wheel support assemblies which are particularly useful for trailers and other similar types of vehicles. More specifically, my invention relates to a unique form of vehicle wheel support assembly in which the various sets of wheels making up the individual assemblies are pivotally mounted for compensating for all types of variations and unevenness in a road surface, and also may be formed pivotal for aiding in turning the various forms of vehicles having excessive lengths.

Many different prior forms of wheel assemblies have been provided for supporting trailers and other similar types of vehicles, and this is particularly true in the recent decade, in view of the desirability, due to the provision of compact and more powerful engines, to increase the lengths of trailers and similar types of devices in order that greater loads may be carried by a single vehicle. Further, as the result of these greater lengths of trailers, it has become important to provide certain of the wheel assemblies thereof formed for aiding in turning the trailers in the shortest practical turning radius possible in order to be compatible with modern highway construction and particularly in the metropolitan areas.

A further requirement in the more modern vehicle wheel supporting structures and due to the increased load carried by an individual vehicle is that this load must be distributed over an increasingly number of supporting wheels, not only so the individual wheels will be subjected to less individual load and thereby require less individual strength, but also so that the greater load is distributed over a greater number of road contacting surfaces, thereby conforming the individual wheel or axle loads to road regulations.

Still another factor to consider in the provision of modern vehicle wheel supporting structures of the types used in trailers is that, in order to provide the necessary road contacting surfaces and the proper support for the increased loads, it is necessary to use increasing numbers of dual wheel assemblies, that is, laterally adjacent sets of wheels on a single axle, as opposed to single wheels. As a result, the narrowness of many road surfaces has resulted in the problem that, with most prior constructions, only a single wheel of a particular dual set might be actually on the road surface and be required to provide the entire support for the portion of the load intended for the dual set of wheels, thereby resulting in uneven and erratic tire wear between the various wheels, as well as increased damage and wear to the various connected structures of the trailer, such as axles, bearings and related springs mountings.

Still a further problem in vehicle wheel supporting assemblies under modern use conditions is the increased speeds possible, not only with the modern, more powerful engines, but also with the modern super-highways, resulting in increasingly heavier loads carried over an increasingly longer period of time. With these increased speeds and despite the improved smoothness of the modern highways, it is necessary for the wheel assemblies to withstand greater shock loads, thereby requiring increased strengths, as well as improved cushioning means for the trailer or other vehicle being supported.

It is, therefore, a general object of the present invention to provide an improved vehicle support for trailers and the like which overcomes certain of the disadvantages and satisfies certain of the problems encountered with the prior constructions as discussed in the foregoing.

It is a primary object of the present invention to provide an improved vehicle wheel support for trailers and the like which includes improved overall supporting structures, improved cushioning structures, and where required and desirable, improved self-turning structures.

It is a further object of the present invention to provide as improved vehicle wheel support for trailers and the like in which various wheel assemblies at various locations along the lengths of trailers are made up of individually supported sets of wheels, with there being a separate and independent axle for each of these sets of wheels.

It is still another object of the present invention to provide an improved vehicle wheel support for trailers and the like of the foregoing type in which each of the sets of wheels is mounted vertically pivotal about a generally longitudinally extending axis, as well as vertically pivotal about a general laterally extending axis, and where required and desired, horizontally pivotal about a generally vertical axis for aiding in turning of the particular vehicle being supported.

Finally, it is an object of the present invention to provide an improved vehicle wheel support for trailers and the like which satisfies all of the above objects in a relatively simple and efficient manner, and may be provided at a minimum of relative cost.

These and other objects are accomplished by the parts, constructions, arrangements, combinations and subcombinations comprising the present invention, a preferred embodiment of which—illustrative of the best mode in which applicant has contemplated applying the principles —is set forth in the following description and illustrated in the accompanying drawings, and which is particularly and distinctly pointed out and set forth in the appended claims forming a part hereof.

In general terms, the vehicle wheel support for trailers and the like comprising the present invention may be stated as including a main frame having at least longitudinally spaced supporting front and rear wheel assemblies, and in certain cases, an intermediate wheel assembly forwardly adjacent the rear wheel assembly. Further, each of these wheel assemblies is formed by generally axially aligned, laterally spaced sets of generally axially aligned, laterally spaced wheels, with axle means extending laterally between the wheels of each set for rotatably supporting these wheels.

Furthermore, the construction includes longitudinally extending support means operably connected to each axle means laterally intermediate the wheels of each set for mounting each set pivotal in a generally vertical plane about a generally longitudinal pivot axis relative to the main frame. Also, there is means operably connected between each support means of each set and the main frame spaced longitudinally forwardly of the axle means for mounting the support means pivotal in a generally vertical plane about a generally lateral axis relative to said main frame, and resilient means operably connected between each support means of each set and the main frame spaced longitudinally of the axle means for resiliently resisting this pivoting of the support means about the generally lateral axis.

Finally, there is means operably connected between such support means of each set of the front wheel assembly and the main frame, and where provided, between each support means of each set of the intermediate wheel assembly and the main frame, which means is spaced longitudinally forwardly of the particular axle means for mounting the particular support means pivotal in a generally horizontal plane about a generally vertical axis relative to the main frame.

Thus, the vehicle wheel support construction of the present invention provides independent pivoting of each individual set of wheels to compensate for uneven road surfaces in a lateral direction, independent pivoting of each individual set of wheels to compensate for uneven road surfaces in a lingitudinal direction, independent cushioning between each individual set of wheels and the main frame of the vehicle, and also independent pivoting of certain of the individual sets of wheels in a generally horizontal plane for aiding in turning the vehicle.

Figure 2:
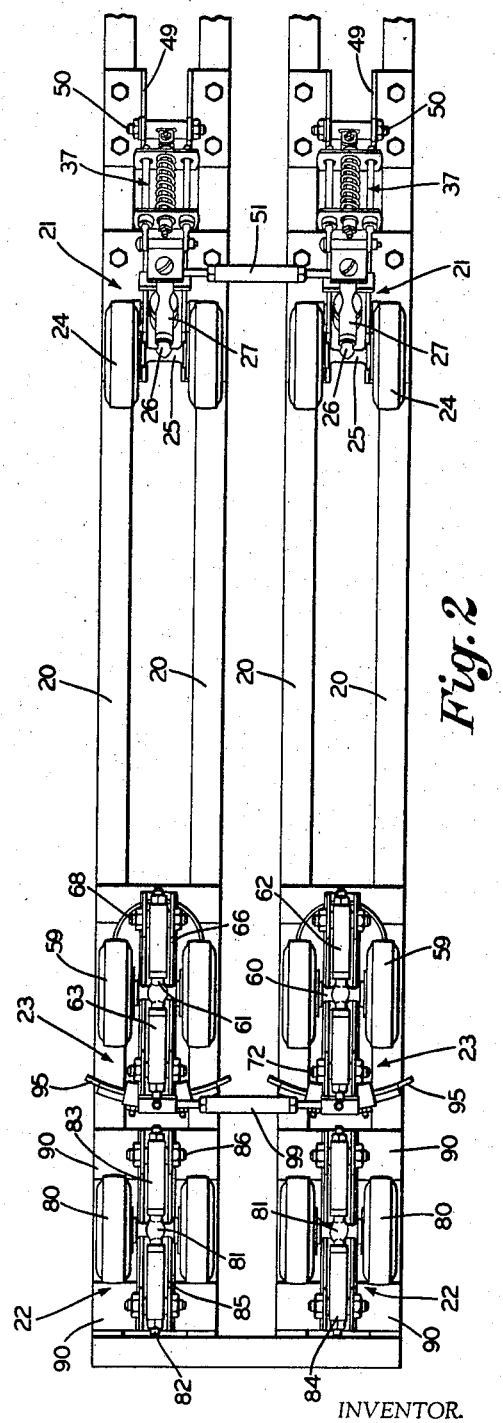
Figure 16:
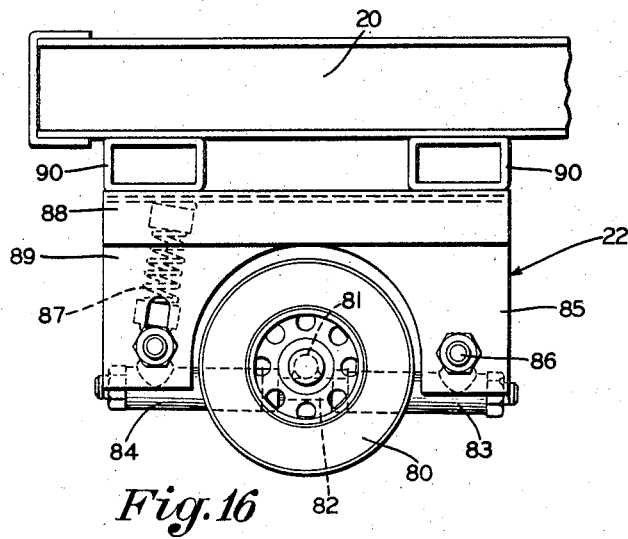
Figure 17:
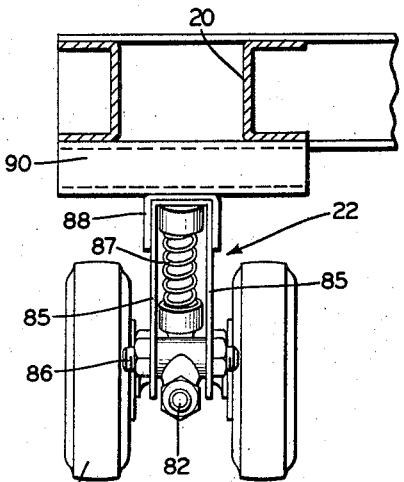
Figure 7:
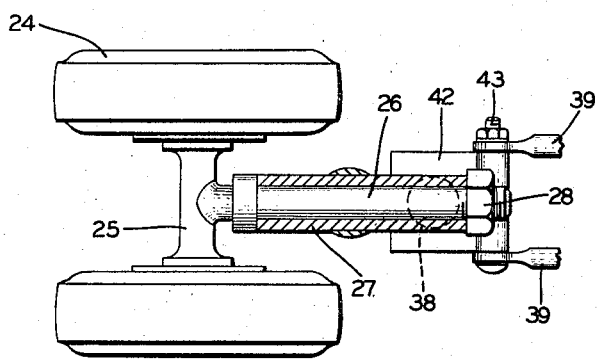
Figure 8:
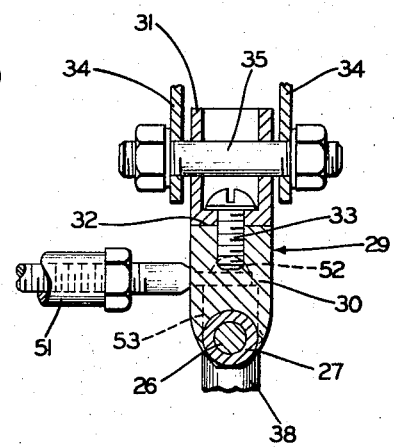
Figure 9:
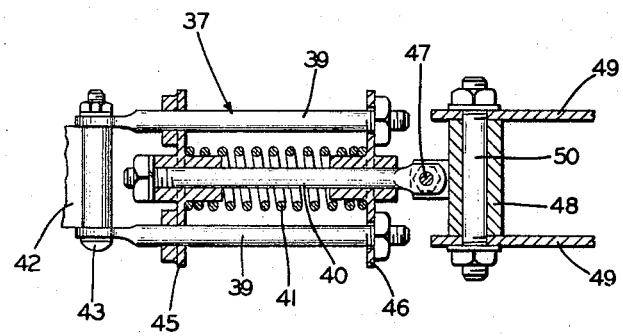

By way of example, an embodiment of the vehicle wheel support for trailers and the like of the present invention is illustrated in the accompanying drawings forming a part hereof, wherein like numerals indicate similar parts throughout the several views, and in which:

FIG. 1 is a fragmentary side elevation of a trailer construction incorporating the front, rear and intermediate wheel assemblies of the present invention;

FIG. 2, a bottom plant view of the trailer construction of FIG. 1;

FIG. 3, an enlarged fragmentary side elevation of one of the independent sets of wheels of the front wheel assembly;

FIG. 4, a fragmentary bottom plan view of the set of wheels of FIG. 3;

FIG. 5, a fragmentary rear elevation of the set of wheels of FIG. 3;

FIG. 6, an enlarged fragmentary front elevation of the sets of wheels of the front wheel assembly;

FIG. 7, an enlarged fragmentary sectional view, part in elevation, looking in the direction of the arrows 7—7 in FIG. 3;

FIG. 8, an enlarged fragmentary sectional view, part in elevation, looking in the direction of the arrows 8—8 in FIG. 3;

FIG. 9, an enlarged fragmentary sectional view, part in elevation, looking in the direction of the arrows 9—9 in FIG. 3;

FIG. 10, an enlarged fragmentary side elevation of one of the sets of wheels of the intermediate wheel assembly;

FIG. 11, a fragmentary bottom plan view of the set of wheels of FIG. 10;

FIG. 12, a fragmentary rear elevation of the set of wheels of FIG. 10;

FIG. 13, a fragmentary front elevation of the set of wheels of FIG. 10;

FIG. 14, an enlarged fragmentary sectional view, part in elevation, looking in the direction of the arrows 14—14 in FIG. 10;

FIG. 15, an enlarged fragmentary sectional view, part in elevation, looking in the direction of the arrows 15—15 in FIG. 10;

FIG. 16, an enlarged fragmentary side elevation of one of the sets of wheels of the rear wheel assembly; and FIG. 17, a fragmentary front elevation of the set of wheels of FIG. 16.

Referring to the drawings, and particularly FIGS. 1 and 2, the illustrated embodiment of the vehicle wheel support for trailers and the like of the present invention includes a usual trailer bed formed by the main frame members 20 and upon which may be provided any form of trailer construction, not shown. The traler main frame members 20 are supported, in the particular embodiment shown, by three wheel assemblies, a front wheel assembly, generally indicated at 21, a rear wheel assembly, generally indicated at 22, positioned spaced longitudinally rearwardly of the front wheel assembly 21, and an intermediate wheel assembly, generally indicated at 23, preferably positioned relatively closely forwardly adjacent the rear wheel assembly 22.

From the general standpoint and to be more particularly described in detail, each of these front, rear and intermediate wheel assemblies 21, 22 and 23 is formed by axially aligned and laterally spaced sets of axially aligned and laterally spaced wheels, with each set of wheels being mounted pivotal in a generally vertical plane about a generally longitudinal pivot axis relative to the main frame, as well as pivotal in a generally vertical plane about a generally lateral axis relative to the main frame, and this latter pivotal movement about the generally lateral axis is resiliently resisted, thereby providing cushioning means for the trailer. Also, the sets of wheels in the front and intermediate wheel assemblies 21 and 23 are operably connected to the main frame member 20 for pivotal movement of each individual set in a generally horizontal plane about a generally vertical axis for aiding in turning trailers of excessive lengths, with the sets of wheels in the front wheel assembly 21 obviously requiring greater turning movement for a particular turning radius than the sets of wheels in the intermediate wheel assembly 23.

Referring to FIGS. 1 through 9, the front wheel assembly 21 is formed by the axially aligned, laterally spaced sets of axially aligned, laterally spaced wheels 24, with the wheels of each set being mounted rotatable on a laterally extending axle 25. Each of the sets of wheels 24 of the front wheel assembly 21 is supported on the main frame members 20 in a substantially identical manner, so that a description of one will suffice for both.

The axle 25 is secured intermediate the wheels 24, and preferably midway of the lateral length of axle 25, to a generally longitudinally forwardly extending support shaft 26, with this support shaft being rotatably telescopically received for rotation about the shaft longitudinally extending axis by the support sleeve 27. The support shaft 26 is received forwardly through the support sleeve 27 and is secured rotatable therein in any usual manner, such as the fastening nut 28, thereby mounting the set of wheels 24, through the axle 25 thereof, simultaneously pivotal in a generally vertical plane about a generally longitudinal axis formed by the support shaft 26.

An upright pivot member 29 is secured to the support sleeve 27, preferably approximately midway thereof and spaced longitudinally forwardly of the wheel axle 25, with this upright pivot member, as best seen in FIG. 8, being formed by a lower pivot portion 30 and an upper pivot portion 31 joined at a generally horizontally extending pivot surface 32 by a generally vertically extending pivot screw 33. The upper pivot portion 31 extends generally vertically upwardly, laterally between the laterally spaced, generally longitudinally extending auxiliary frame plates 34 and is pivotally secured thereto by the generally laterally extending pivot bolt 35.

The auxiliary frame plates 34 are secured to the main frame member 20, positioned as described, by any usual fastening means, so that these auxiliary frame plates 34, through the support sleeve 27, upright pivot member 29, and pivot bolt 35, mount the set of wheels 24 on axle 25 simultaneously pivotal in a generally vertical plane about a generally lateral axis formed by the pivotal bolt 35. It will be noted that, in view of the forward positioning of the upright pivot member 29 spaced longitudinally forwardly of the wheel axle 25, the set of wheels 24 is mounted with a caster effect. Also, the weight on the trailer main frame members 20 will tend to pivot the wheels 24 and axle 25 in a clockwise direction, as viewed in FIGS. 1 and 3, but, for safety purposes, to prevent any possibility of the wheels 24 pivoting in a counterclockwise direction longitudinally forwardly ahead of the lateral pivot axis through the pivot bolt 35, a stop member 36 is mounted on the auxiliary frame plates 34 to limit such counterclockwise pivoting.

Still further, due to the particular construction of the upright pivot member 29 being formed by the lower pivot portion 30 and upper pivot portion 31 joined by the pivot screw 33 at the generally horizontal pivot surface 32, the set of wheels 24 and axle 25 are mounted pivotal in a generally horizontal plane about a generally vertical axis formed by the pivot screw 33 so as to be turnable. Again, the fact that the upright pivot member 29 is spaced longitudinally forwardly of the wheels 24 and axle 25, the caster effect created tends to position the wheels 24 directed substantially straight forwardly when the trailer is pulled straight forwardly.

A spring assembly, generally indicated at 37 and shown in detail in FIG. 9, is secured by the downwardly extending projection 38 to a forward end of the support sleeve 27, preferably spaced forwardly of the upright pivot member 29 and thereby spaced even further forwardly of the wheel axle 25. This spring assembly is formed by the laterally spaced, generally longitudinally extending side spring slides 39, center spring slide 40, and coil compression spring 41. Further, the rearward ends of the side spring slides 39 are secured pivotal in generally vertically planes to a fastening plate 42 through a laterally extending pivot bolt 43, with fastening plate 42 being secured to the downwardly extending projection 38 in any usual manner, such as the bolt 44.

Side spring slides 39 are slidably telescoped by the longitudinally spaced spring plates 45 and 46, which spring plates centrally receive the center spring slide 40. As shown in FIG. 9, the rearward end of the center spring slide 40 is secured to the spring plate 45 and is longitudinally slidably received through the spring plate 46, with the compression spring 41 positioned between these spring plates 45 and 46 and telescoped over the center spring slide 40.

The forward end of the center spring slide 40 is pivotally secured through a pivot pin 47 to a laterally extending pivot sleeve 48, pivotal in a generally horizontal plane about a generally vertical axis. Pivot sleeve 48 is, in turn, received between the auxiliary frame plates 49 and is pivotally secured to these auxiliary frame plates 49 through the pivot bolt 50, pivotal in a generally vertical plane about a generally lateral axis. Finally, the auxiliary frame plates 49 are secured to the main frame members 20 in any usual manner and extend downwardly therefrom for mounting this spring assembly 37 as described.

Thus, the compression spring 41 resiliently resists the pivotal movement of the set of wheels 24 and axle 25 thereof in the generally vertical plane about the generally lateral axis as provided by the upright pivot member 29 and the laterally extending pivot bolt 35 previously described, thereby providing the necessary cushioning for the load on the trailer. At the same time, the turning movement of the set of wheels 24 is permitted despite the forward extension of the spring assembly 37, that is, the turning pivotal movement in the generally horizontal plane about the generally vertical axis provided by the lower and upper pivot portions 30 and 31 of the upright pivot member 29, by the pivotal connection between the center spring slide 40 and the pivot sleeve 48 through the pivot pin 47, although this turning movement is somewhat resiliently resisted by the compression spring 41 and this spring force will tend to resiliently urge the set of wheels 24 into a straight forwardly directed position.

In order to maintain the two sets of wheels 24 of the front wheel assembly 21 turnable in unison, a tie bar 51, as probably best shown in FIG. 6, extends laterally between the sets of wheels 24 and is pivotally secured at the ends thereof to the forward ends of the support sleeves 27 by the bolts 52 (shown in FIG. 3) received in the upwardly extending projections 53.

Also, in order to lock the sets of wheels 24 of the front wheel assembly 21 in the straight forwardly directed position for backing of the trailer, a selectively operable locking assembly, generally indicated at 54 and best seen in FIGS. 3 and 5, is formed by the hydraulic or air cylinder 55 secured to the main frame members 20 and remotely controlled in the usual manner, which cylinder has the lock bolt 56 slidably received telescoped through the mounting sleeve 57 on the upper pivot portion 31 of upright pivot member 29. This lock bolt 56 is extendible by cylinder 55 for engagement between the spaced locking lugs 58 on the lower pivot portion 30 of upright pivot member 29 as shown.

Thus, the locking assembly 54 is selectively operable for effectively preventing the previously described pivoting of the sets of wheels 24 in the horizontal plane about the generally vertical axis or the turning movement of these sets of wheels. Furthermore, due to the tying together of the two sets of wheels 24 of the front wheel assembly 21 for turning movement in unison by the tie bar 51, only one locking assembly 54 is required for this front wheel assembly, since obviously, the locking of one set of wheels against turning will automatically lock the other set of wheels against turning.

The rear and intermediate wheel assemblies 22 and 23 are substantially identical with the exception that the intermediate wheel assembly 23 is mounted on the main frame members 20 for the turning movement, that is, pivotal movement in a generally horizontal plane about generally vertical axes, whereas the rear wheel assembly 22 does not turn. Furthermore, each set of wheels of the rear wheel assembly 22 and each set of wheels of the intermediate wheel assembly are substantially identically mounted, so that the mounting of one set of wheels of the intermediate wheel assembly 23 will be described and merely the differences between the mounting of this one set of wheels of the intermediate wheel assembly 23 and the sets of the rear wheel assembly 22 pointed out.

Referring to FIGS. 1, 2 and 10 through 15, each set of wheels of the intermediate wheel assembly 23 is formed by the axially aligned and laterally spaced wheels 59 mounted on the laterally extending axle 60, which is, in turn, secured to a longitudinally central portion of the longitudinally extending support shaft 61. Support shaft 61 is pivotally and longitudinally telescoped forwardly and rearwardly by the forward support sleeve 62 and rearward support sleeve 63, being secured therein by the nuts 64 and 65, and, therefore, again mounting the set of wheels 59 pivotal in a generally vertical plane about a generally longitudinal axis through the pivotal movement of the support shaft 61 in the forward and rearward support sleeves 62 and 63.

The support shaft 61 and the forward and rearward support sleeves 62 and 63 are positioned generally laterally between the vertically and longitudinally extending auxiliary frame plates 66. Further, a forward portion of the forward support sleeve 62 is pivotally secured at a point spaced forwardly of the wheel axle 60 to these auxiliary frame plates 66 by means of an upper projection 67 receiving the pivot bolt 68 pivotally and laterally therethrough, which pivot bolt is mounted laterally through and between a lower portion 69 of the auxiliary frame plates 66, as shown. This, thereby, mounts the forward support sleeve 62 and thus the support shaft 61, axle 60 and wheels 59, pivotal in the generally vertical plane about the generally lateral axis formed through the pivot bolt 68.

The rearward portion of the rearward support sleeve 63 spaced longitudinally rearwardly of the axle 60 is pivotally secured about a generally lateral axis to the lower spring cap 70 through the upward projection 71 and the laterally extending pivot bolt 72, as best seen in FIG. 14. Also, the outer ends of pivot bolt 72 are received laterally through the auxiliary frame plates 66 and secured by the nuts 73, with this pivot bolt 72 being generally vertically movable relative to the auxiliary frame plates 66 in the generally vertically extending slots 74 formed in the auxiliary frame plates, as shown.

The lower end of a coil compression spring 75 is received downwardly within the lower spring cap 70, with this coil compression spring 75 extending generally vertically upwardly, laterally between the auxiliary frame plates 66, and having an upper spring cap 76 mounted securely against the generally horizontal surface 77 provided by the cap portion 78 formed over the upper portion 79 of the auxiliary frame plates 66. Thus, the pivotal movement of the forward support sleeve, and thereby the wheels 59, axle 60 and support shaft 61, in the generally vertical plane about the generally lateral axis formed through the pivot bolt 68, is resiliently resisted by the coil compression spring 75 between the rearward support sleeve 63 and the cap portion 78 at the upper portion 79 of auxiliary frame plates 66.

It should be pointed out that, in view of the fact that the wheels 59 and axle 60 are suspended substantially longitudinally midway between the forward pivot connection about the generally lateral axis, which is the pivot bolt 68, and the rearward cushioning means, which is the coil compression spring 75, the load to the set of wheels 59 and axle 60 will be divided partially through this pivotal connection and partially through this cushioning means or compression spring. In this manner, less strength is required at either location and maintenance problems may be reduced.

As previously referred to, to the point thus far described, the mounting for the sets of wheels of the rear and intermediate wheel assemblies 22 and 23 are substantially identical, so that, referring to FIGS. 16 and 17, the sets of wheels of the rear wheel assembly 22 are formed by the axially aligned and laterally spaced wheels 80, the laterally extending axle 81, the longitudinally extending support shaft 82, the forward and rearward support sleeves 83 and 84, the generally vertically extending and laterally spaced auxiliary frame plates 85, the forward pivot bolt 86 connecting the forward support sleeve 83 to frame plates 85 for the pivoting in the generally vertical plane about the generally lateral axis, and the rearward coil compression spring 87 resiliently resisting this pivotal movement.

In the case of the sets of wheels of the rear wheel assembly 22, however, the cap portion 88 formed at the upper portion 89 of the auxiliary frame plates 85 is secured solidly on the cross frame members 90, which cross frame members are in turn secured to the undersides of the main frame members 20, so that the sets of wheels 80 of the rear wheel assembly 22 are only mounted for pivotal movement in the generally vertical planes about the longitudinally extending axes, and for pivotal movement in the generally vertical planes about the laterally extending axes, but with no turning movement being provided.

Returning to the description of the intermediate wheel assembly 23, as best seen in FIGS. 10 through 15, the cap portion 78 formed at the upper portion 79 of the auxiliary frame plate 66 is provided with a generally horizontally extending, preferably circular pivot plate 91, extending forwardly of the wheel axel 60. Further, this pivot plate 91 is slidably abutted by an overlying second circular pivot plate 92, secured upwardly to the cross frame members 93, which are in turn secured to the main frame members 20. These pivot plates 91 and 92 are maintained positioned for relative circular slidable movement therebetween by the generally vertically extending pivot bolt 94, thereby providing a generally vertical pivot axis spaced forwardly of the axle 60 about which the set of wheels 59 may pivot in a generally horizontal plane. The relative slidable movement between the pivot plates 91 and 92 may be provided in any usual manner, such as by the usual grease slots or various forms of bearings, not shown.

In order to aid in supporting the load on the main frame members 20 during this turning movement of the sets of wheels 59, a generally laterally extending arcuate track member 95 is secured to the main frame members 20 spaced rearwardly of the axle 60 and extending downwardly rearwardly adjacent the cap portion 78 formed at the upper portion 79 of the auxiliary frame 66. Track member 95 is formed with the downwardly exposed roller track surface 96.

A pair of laterally spaced rollers 97 are secured to the cap portion 78 of the auxiliary frame plates 66, with these rollers 97 being rotatably mounted in the brackets 98 bearing upwardly against the previously described roller track surface 96 of track member 95. Thus, a roller support is provided for the set of wheels 59 spaced longitudinally rearwardly of the axle 60 for the pivotal turning movement of this set of wheels.

It will be noted that the curvature of the track member 95 is preferably described from the generally vertical pivot axis formed through the pivot bolt 94 and about which the set of wheels 59 pivots for the turning motion. Furthermore, the roller axis of the rollers 97 is also preferably aligned with this same vertical pivot axis in order that there will be no longitudinal slidable movement between the rollers 97 and roller track surface 96.

In order to maintain the pivotal movement for turning of the two sets of wheels 59 of the intermediate wheel assembly 23 in unison, a tie bar 99 is again provided extending laterally between the sets of auxiliary frame plates 66 having the ends thereof pivotally secured to brackets 100 on the auxiliary frame plates 66 through pivot bolts 101. Also, a locking assembly 102, shown in detail in FIG. 15, is mounted on one of the cap portions 78 of the auxiliary frame plates 66 selectively engageable with one of the track members 95 for retaining the sets of wheels 59 of the intermediate wheel assembly 23 positioned extending straight forwardly and against turning movement during backing of the trailer. Again, an air or hydraulic cylinder 103 remotely controlled in the usual manner is mounted on the cap portion 78 of the auxiliary frame plates 66 having a selectively extendible lock bolt 104 engageable through an opening 105 formed centrally of the track member 95, thereby selectively locking the particular set of wheels 59 against turning movement and, through the tie bar 99, also locking the other set of wheels 59.

It is preferred to provide individual brake assemblies for each of the sets of wheels of each of the front, rear and intermediate wheel assemblies 21, 22 and 23 formed and controlled in the usual manner to provide the maximum of braking effect on the trailer. Also, it should be understood that the various coil springs shown could be replaced in certain cases with other forms of resilient means, such as air bags and the like, without departing from the broad principles of the present invention.

Thus, according to the principles of the present invention, the front wheel assembly mounts the individual sets of wheels 24 thereof for pivotal movement in a generally vertical plane about a generally longitudinal axis, as indicated by the broken lines in FIG. 5, pivotal movement in a generally vertical plane about a generally lateral axis, as indicated by the broken lines in FIG. 3, and pivotal movement in a generally horizontal plane about a generally vertical axis, as indicated by the broken lines in FIG. 4. Furthermore, the generally lateral pivot axes and generally vertical pivot axes are spaced forwardly of the axles 25, thereby mounting each set of wheels 24 so as to give a caster effect when the trailer is pulled forwardly.

Also, according to the principles of the present invention, both the rear and intermediate wheels assemblies 22 and 23 provide the individual sets of wheels 59 and 80 thereof with pivotal movement in a generally vertical plane about a generally longitudinal axis, as indicated by the broken lines in FIG. 13, and pivotal movement in a generally vertical plane about a generally lateral axis, as indicated by the broken lines in FIG. 10, with this lateral axis again being spaced forwardly of the particular axles 60 or 81. In addition, the sets of wheels 59 of the intermediate wheel assembly 23 are mounted for pivotal movement in a generally horizontal plane about a generally vertical axis, as indicated by the broken lines in FIG. 11, with this axis being spaced forwardly of the axle 60 to give the previously described caster effect.

In the foregoing description, certain terms have been used for brevity, clearness and understanding, but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous, new and useful results obtained thereby, the new and useful construction and reasonable mechanical equivalents thereof obvious to those skilled in the art is set forth in the appended claims.

I claim:

1. Vehicle wheel support for trailers and the like including a main frame having at least longitudinally spaced supporting front and rear wheel assemblies, each of the wheel assemblies having generally axially aligned laterally spaced sets of generally axially aligned laterally spaced wheels, axle means extending laterally between the wheels of each set for rotatably supporting the wheels of each set, longitudinally extending support means operably connected to each axle means laterally intermediate the wheels of each set for mounting each set pivotal in a generally vertical plane about a generally longitudinal pivot axis relative to the main frame, means operably connected betwen each support means of each set and the main frame spaced longitudinally forwardly of the axle means for mounting the support means pivotal in a generally vertical plane about a generally lateral axis relative to said main frame, resilient means operably connected between each support means of each set and the main frame spaced longitudinally of the axle means for resiliently resisting said pivoting of the support means about said generally lateral axis, means operably connected between each support means of each set of the front wheel assembly and the main frame spaced longitudinally forwardly of the axle means for mounting the support means pivotal in a generally horizontal plane about a generally vertical axis relative to the main frame and tie bar means operably connected generally laterally between the support means of the front wheel assembly longitudinally forwardly of the means mounting the support means pivotal in the generally horizontal plane about the generally vertical axis for maintaining said pivoting of the front wheel assembly support means in unison.

2. Vehicle wheel support for trailers and the like as defined in claim 1 in which selectively operable lock means are operably connected between the support means of the front wheel assembly and the main frame for selectively locking the support means against said pivotal movements about the generally vertical axis and with each axle means extending laterally.

3. Vehicle wheel support for trailers and the like including a main frame having at least longitudinally spaced supporting front and rear wheel assemblies and an intermediate wheel assembly forwardly adjacent the rear wheel assembly, each of the wheel assemblies having generally axially aligned laterally spaced sets of generally axially aligned laterally spaced wheels, axle means extending laterally between the wheels of each set for rotatably supporting the wheels of each set, longitudinally extending support means operably connected to each axle means laterally intermediate the wheels of each set for mounting each set pivotal in a generally vertical plane about a generally longitudinal pivot axis relative to the main frame, means operably connected between each support means of each set and the main frames spaced longitudinally forwardly of the axle means for mounting the support means pivotal in a generally vertical plane about a generally lateral axis relative to said main frame, resilient means operably connected between each support means of each set and the main frames spaced longitudinally of the axle means for resiliently resisting said pivoting of the support means about said generally lateral axis, means operably connected between each support means of each set of the front and intermediate wheel assemblies and the main frame spaced longitudinally forwardly of the axle means for mounting the support means pivotal in a generally horizontal plane about a generally vertical axis relative to the main frame, tie bar means operably connected generally laterally between the respective support means of the front and intermediate wheel assemblies longitudinally forwardly of the means mounting the support means pivotal in the generally horizontal planes about the generally vertical axis to maintain said pivoting of the respective front and intermediate wheel assembly support means in unison, and selectively operable lock means operably connected between the support means of the respective front and intermediate wheel assemblies and main frame for selectively locking the support means against said pivotal movements about the generally vertical axis and with each axle means extending laterally.

4. Vehicle wheel support construction for mounting on the main frame of trailers and the like including a set of generally axially aligned laterally spaced wheels, axle means extending laterally between the wheels for rotatably supporting the wheels, longitudinally extending support means operably connected to the axle means laterally intermediate the wheels for mounting the axle means and wheels pivotal in a generally vertical plane about a generally longitudinal pivot axis relative to a main frame, means operably connected between the support means and the main frame spaced longitudinally forwardly of the axle means for mounting the support means pivotal in a generally vertical plane about a generally lateral axis relative to said main frame, resilient means operably connected between the support means and the main frame spaced longitudinally of the axle means for resiliently resisting said pivoting of the support means about said generally lateral axis, means operably connected between the support means and the main frame spaced longitudinally forwardly of the axle means for mounting the support means pivotal in a generally horizontal plane about a generally vertical axis relative to the main frame, said means operably connected between the support means and the main frame for mounting the support means pivotal about said generally lateral axis including a generally vertically upwardly extending mounting member secured to the support means and spaced longitudinally forwardly of the axle means and having an upper end pivotally connected to the support means pivotal about a generally lateral axis; said resilient means including coil spring means operably connected to a forward end of the support means longitudinally forwardly of said mounting member and the coil spring means extending angled generally longitudinally forwardly and upwardly and operably connected to the main frame, and in which the means opearbly connected between the support means and the main frame includes a first pivot means in said mounting member intermediate the support means and the main frame, and a second pivot means operably connected to the coil spring means between the coil spring means and one of the support means forward end and main frame.

5. Vehicle wheel support construction as defined in claim 4 in which selectively operable lock means is operably connected between the support means and main frame for selectively locking the support means with the axle means extending laterally; and in which the lock means is at least partially mounted on said mounting member constructed and arranged for selective engagement across said first pivot means to lock the support means against said pivotal movement about the generally vertical axis and with the axle means extending laterally.

6. Vehicle wheel support construction for mounting on the main frame of trailers and the like including a set of generally axially aligned laterally spaced wheels, axle means extending laterally between the wheels for rotatably supporting the wheels, longitudinally extending support means operably connected to the axle means laterally intermediate the wheels for mounting the axle means and wheels pivotal in a generally vertical plane about a generally longitudinal pivot axis relative to a main frame, means operably connected between the support means and the main frame spaced longitudinally forwardly of the axle means for mounting the support means pivotal in a generally vertical plane about a generally lateral axis relative to said main frame, resilient means operably connected between the support means and the main frames spaced longitudinally of the axle means for resiliently resisting said pivoting of the support means about said generally lateral axis, means operably connected between the support means and the main frames spaced longitudinally forwardly of the axle means for mounting the support means pivotal in a generally horizontal plane about a generally vertical axis relative to the main frame, said support means having forward and rearward ends and the axle means positioned intermediate the support means ends, said means operably connected between the support means and main frame mounting the support means pivotal about a generally lateral axis including pivot means operably connected between the support means forward end and a lower portion of an auxiliary frame means, said resilient means including coil spring means connected between the support means rearward end and an upper portion of said auxiliary frame means, said means operably connected between the support means and the main frame for mounting the support means pivotal while the generally vertical axis including pivot means operably connected between said upper portion of the auxiliary frame means and main frame longitudinally forwardly of the axle means and roller means operably connected between the upper portion of the auxiliary frame means and the main frame spaced longitudinally rearwardly of the axle means for roller supporting the auxiliary frame means during pivotal movement through said pivot means about the generally vertical axis.

7. Vehicle wheel support construction as defined in claim 6 in which selectively operable lock means is operably connected between the main frame and the upper portion of the auxiliary frame means spaced longitudinally rearwardly of the axle means for selectively locking the auxiliary frame means against said pivotal movement about the generally vertical axis and with the axle means extending laterally.

8. Vehicle wheel support construction for mounting on the main frame of trailers and the like including a set of generally axially aligned laterally spaced wheels, axle means extending laterally between the wheels for rotatably supporting the wheels, longitudinally extending support means operably connected to the axle means laterally intermediate the wheels for mounting the axle means and wheels pivotal in a generally vertical plane about a generally longitudinal pivot axis relative to a main frame, the support means having forward and rearward ends and the axle means being positioned intermediate said ends, means operably connected between the support means forward end and the main frame for mounting the support means pivotal in a generally vertical plane about a generally lateral axis relative to said main frame, resilient means operably connected between the support means rearward end and the main frame for resiliently resisting said pivoting of the support means about said generally lateral axis, said means operably connected between the support means forward end and the main frame including auxiliary frame means having laterally spaced generally longitudinally extending auxiliary frame members, the auxiliary frame members having upper portions connected to the main frame and lower portions spaced downwardly from the main frame, pivot means operably connected laterally between forward portions of the auxiliary frame members and operably connected to the support means forward end for pivotally connecting the auxiliary frame members and support means forward end for said pivoting about a generally lateral axis; said resilient means including a generally vertically extending coil spring positioned extending upwardly from the support means rearward end laterally between the auxiliary frame members, the coil spring means having an upper end portion operably engaged with the auxiliary frame means laterally between the upper portions of the auxiliary frame members, means operably connected between the support means and the main frames spaced longitudinally forwardly of the axle means for mounting the support means pivotal in a generally horizontal plane about a generally vertical axis relative to the main frame, said means operably connected between the support means and the main frame including pivot means operably connected between the upper portions of the auxiliary frame members and the main frame spaced longitudinally forwardly of the axle means for pivotally connecting the auxiliary frame means to the main frame pivotal in a generally horizontal plane, an arcuate generally laterally extending track member mounted on the main frame extending downwardly adjacent the upper portions of the auxiliary frame members spaced longitudinally rearwardly of the axle means and roller means mounted operably connected to the upper portions of the auxiliary frame members engaging upwardly against the track means for roller supporting the auxiliary frame means against the track means during said pivotal movement of the auxiliary frame means about said vertical axis relative to the main frame.

References Cited
UNITED STATES PATENTS

| | | | |
|---|---|---|---|
| 2,287,723 | 6/1942 | Boyd et al. | 280—81 |
| 2,336,814 | 12/1943 | Suter | 280—81 X |
| 2,395,640 | 2/1946 | Pearson | 280—81 |
| 2,582,716 | 1/1952 | Nelson | 16—44 |
| 2,688,149 | 9/1954 | Popp | 16—23 X |
| 2,710,198 | 6/1955 | Hall. | |
| 2,890,063 | 6/1959 | Stover | 280—109 |
| 2,919,928 | 1/1960 | Hoffer | 280—81 |
| 3,204,977 | 9/1965 | Eisenhauer et al. | 280—81 |

KENNETH H. BETTS, *Primary Examiner.*